United States Patent
Dworkowski et al.

(12) 
(10) Patent No.: US 6,563,130 B2
(45) Date of Patent: May 13, 2003

(54) DISTANCE TRACKING CONTROL SYSTEM FOR SINGLE PASS TOPOGRAPHICAL MAPPING

(75) Inventors: Robert Dworkowski, Edmonton (CA); Peter Wojcik, Calgary (CA)

(73) Assignee: Canadian Space Agency, Saint-Hubert (CA)

( * ) Notice: Subject to any disclaimer, the term of this patent is extended or adjusted under 35 U.S.C. 154(b) by 0 days.

(21) Appl. No.: 10/144,238

(22) Filed: May 10, 2002

(65) Prior Publication Data

US 2002/0190230 A1 Dec. 19, 2002

Related U.S. Application Data

(63) Continuation of application No. 09/250,996, filed on Feb. 16, 1999, now abandoned.

(30) Foreign Application Priority Data

Oct. 21, 1998 (CA) ............................................. 2251243

(51) Int. Cl.$^7$ ........................... G01B 11/26; G01N 21/86
(52) U.S. Cl. .............................. 250/559.33; 219/121.6; 356/152.2; 356/602; 702/158; 250/559.38
(58) Field of Search ....................... 250/559.33, 559.38; 219/121.6, 121.79, 121.82; 340/619; 356/602, 609, 623, 624, 152.2, 139.1; 702/158, 166

(56) References Cited

U.S. PATENT DOCUMENTS 4,618,758 A 10/1986 Gilli et al.
4,728,771 A 3/1988 Sartorio
4,766,322 A 8/1988 Hashimoto
6,115,128 A 9/2000 Vann
6,163,035 A 12/2000 Shibayama et al.

OTHER PUBLICATIONS

Advanced Motion Controls, *25A Series Servo Amplifiers*, product brochure, Camarillo, Calif., undated, 8 pages.
BEI KIMCO product information sheet entitled *Linear Actuator*, Model No. LA13A–30, and Drawing LA09–19–000A, San Marcos, Calif., Jan. 13, 1993, 2 pages.
Copley Controls Corp., *Models 4122Z, 4212Z, DC Brush Servo Amplifiers*, product brochure, Westwood, Mass., undated, 4 pages.
Northern Magnetics Inc., *Non Commutated D.C. Linear Motor*, product brochure, Santa Clarita, Calif., undated, 2 pages.
Northern Magnetics Inc., Drawing MLO–0806–005JB, entitled *Non–Commutated DC Linear Motor Moving Magnet*, Oct. 9, 1996, and *Non–Commutated DC Linear Motor Test Data Sheet*, Santa Clarita, Calif, Apr. 6, 1998, 2 pages.

*Primary Examiner*—Stephone B. Allen
(74) *Attorney, Agent, or Firm*—Christensen O'Connor Johnson Kindness PLLC

(57) ABSTRACT

A distance tracking control system, for use with a working member such as a robotic head, includes a non-contact distance sensor for sensing a distance of the working member from a surface. An actuator is provided for making positional adjustments of the working member in response to changes in the distance sensed by the non-contact distance sensor. A controller is connected to the distance sensor and the actuator. The controller receives data from the non-contact distance sensor and then sends signals to the actuator to make positional adjustments of the working member.

20 Claims, 19 Drawing Sheets

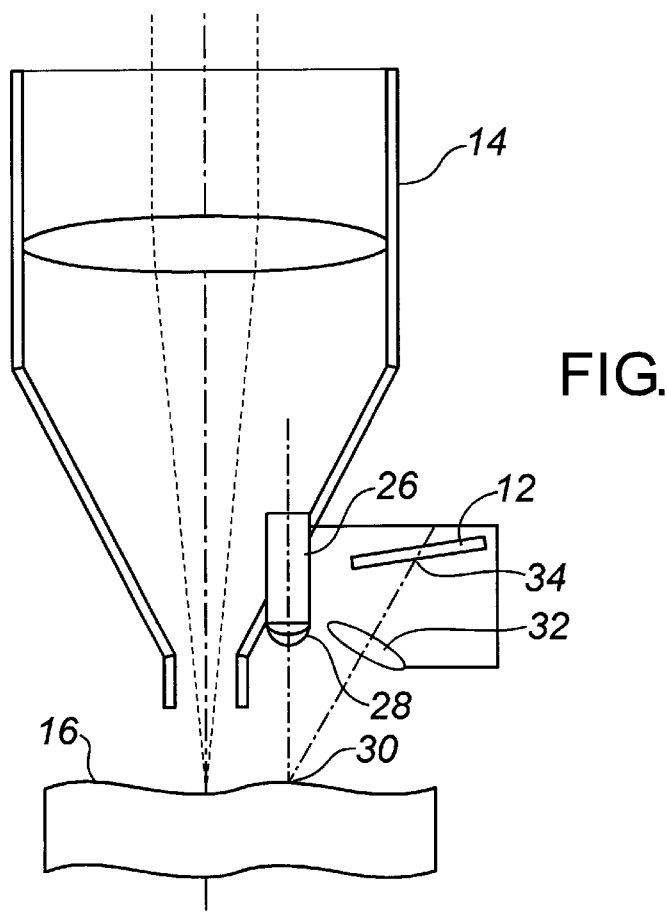
FIG. 5
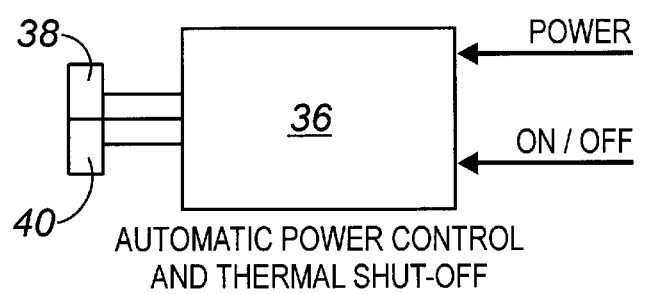
FIG. 6
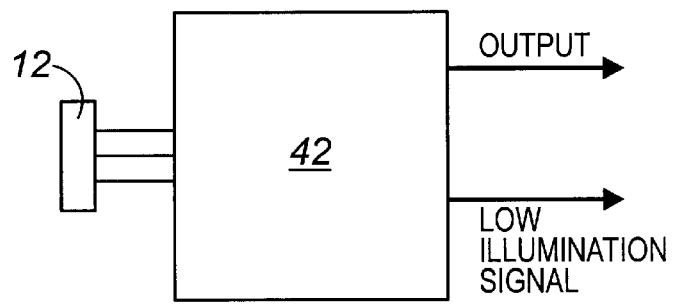

DISTANCE TRACKING CONTROL SYSTEM FOR SINGLE PASS TOPOGRAPHICAL MAPPING

CROSS-REFERENCE TO RELATED APPLICATION

This application is a continuation of prior U.S. application Ser. No. 09/250,996, now abandoned, filed Feb. 16, 1999, priority from the filing date of which is hereby claimed under 35 U.S.C. §120.

FIELD OF THE INVENTION

The present invention relates to a distance tracking control system and, in particular, a distance tracking control system for a working member such as a robotic head

BACKGROUND OF THE INVENTION

There is a need for a distance tracking control system for tracking the distance of a robotic head in relation to a surface of an unknown shape, colour and texture. The robotic head could be mounted on a gantry positioner, or any other type of robotic arm. The system would track the distance between the robotic head and the surface while the robotic head is moving along the surface with a very high speed. Such a system might find applications in space robotics, manufacturing, and the military. The primary commercial application of this distance tracking system will be in laser cutting technology, which application will hereinafter be used to demonstrate the utility of the application.

Laser fabric cutting systems, currently available, have laser cutting heads mounted directly on the beams of gantry positioners, without capability of controlling their focal points. Ideally, to get the best cut by a laser beam, a constant distance must be maintained between the focusing lens and the material to be cut. On the other hand, it is impossible to spread limp material on a cutting table without any waves or bumps. Currently used lenses have about 12.5 cm (5 inch) focal length and, because of focal depth, the system can tolerate up to 5 mm high bumps or waves in the fabric. However, in these places the cut is usually very far from being perfect. A much more efficient way of laser fabric cutting is using lenses with shorter focal lengths (4 cm to 6 cm) that would produce higher energy beams. However, due to the much shorter focal lengths such lenses can accommodate only very small (1 mm) bumps in the fabric. The development of a high speed distance tracking control system will solve this problem, and will allow application of lower power, less costly, gas sealed lasers at additional benefit of much higher quality cut.

A review of the prior art discloses U.S. Pat. No. 4,618,758 by Gilli et al entitled "Focusing Head for a Laser-Beam Cutting Machine". The Gilli reference has a focusing lens which is moved axially by a servomechanism controlled by a position sensor. The position sensor is in sliding contact with the substrate. This sliding contact has a number of inherent drawbacks. In order to maintain sliding contact speed must be limited. In order to maintain sliding contact the substrate must be solid.

SUMMARY OF THE INVENTION

What is required is an alternative distance tracking control system.

According to the present invention there is provided a distance tracking control system which includes a non-contact distance sensor for sensing a distance of a movable working member from a surface. An actuator is provided for making positional adjustments of the working member in response to changes in the distance sensed by the non-contact distance sensor. A controller is connected to the distance sensor and the actuator. The controller receives data from the non-contact distance sensor and then sends signals to the actuator to make positional adjustments of the working member.

There are various technologies that can be used to implement the distance tracking control system, as described above; several of which will hereinafter be further described.

BRIEF DESCRIPTION OF THE DRAWINGS

These and other features of the invention will become more apparent from the following description in which reference is made to the appended drawings, wherein:

FIG. 5 is a detailed side elevation view, in section, of the robotic laser head illustrated in FIG. 2.

FIG. 6 is a schematic view of the robotic laser head illustrated in FIG. 2.

DETAILED DESCRIPTION OF THE PREFERRED EMBODIMENT

The preferred embodiment, a distance tracking control system, will now be described with reference to FIGS. 1 through 30.

Figure 1:
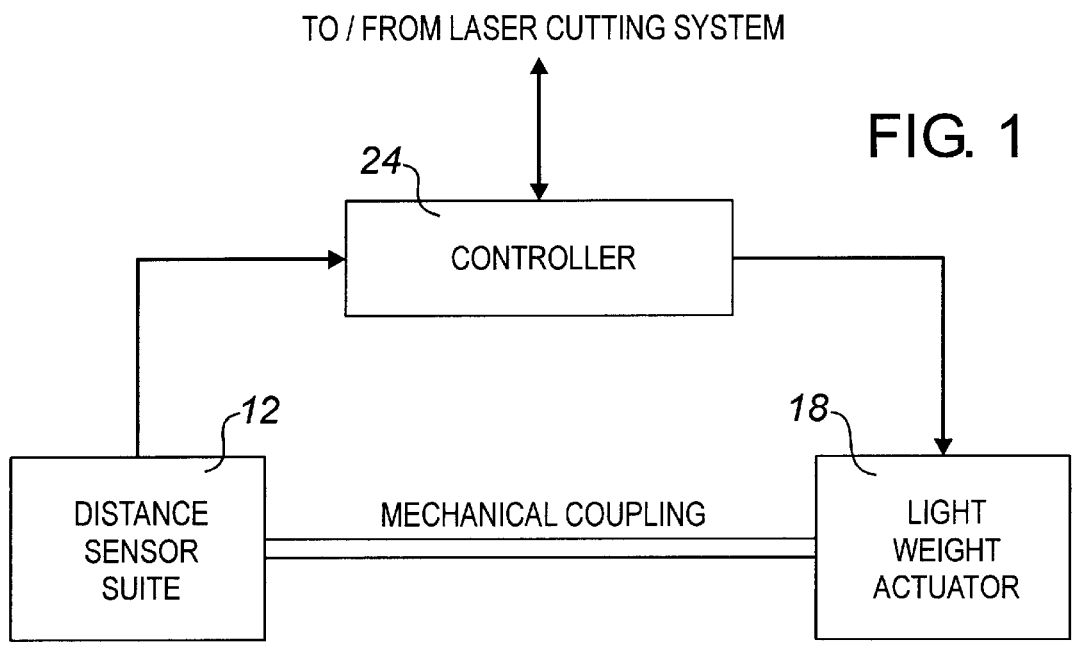
FIG. 1 is a block diagram of a distance tracking control system constructed in accordance with the teachings of the present invention.
Figure 2:
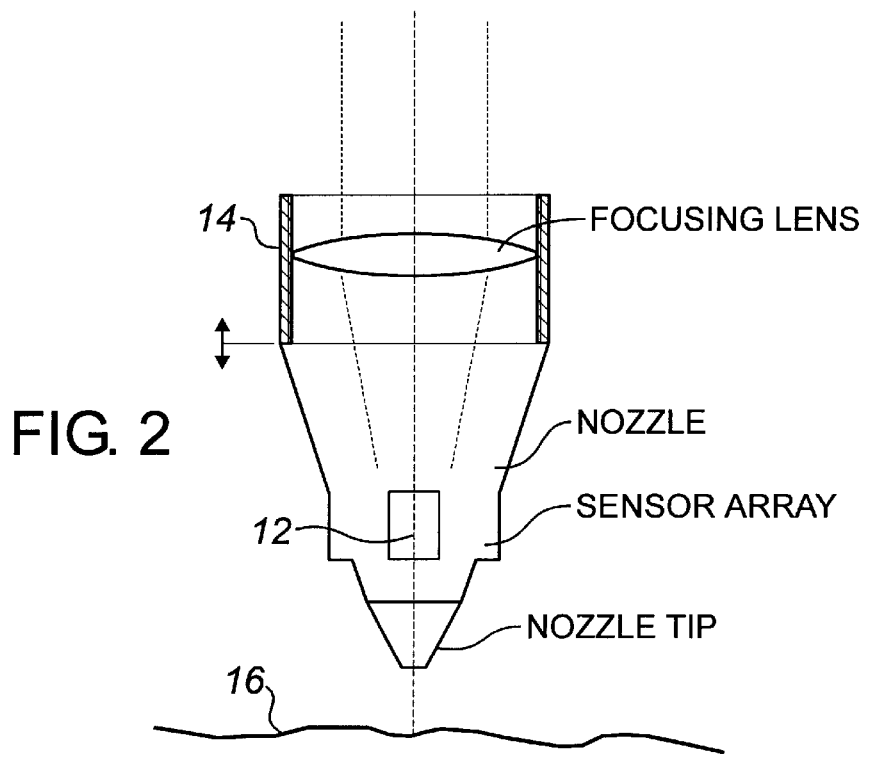
FIG. 2 is a side elevation view, in section, of a robotic laser head constructed in accordance with the teachings of the present invention.
Figure 3:
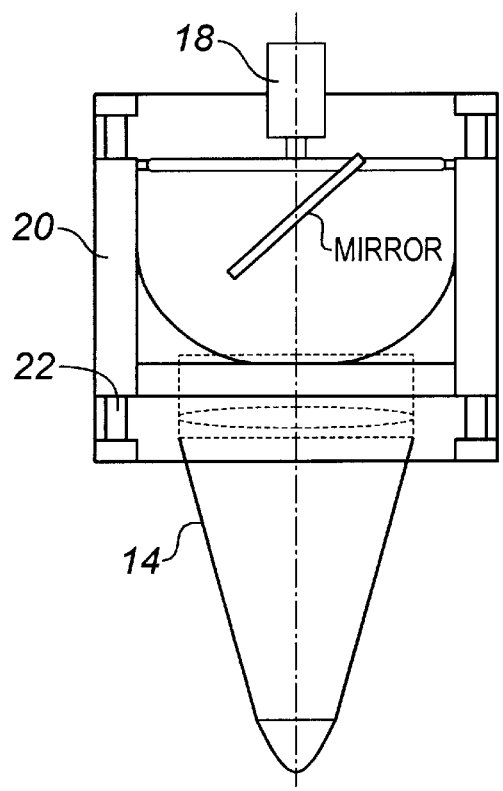
FIG. 3 is a front elevation view, in section, of a second actuator for the robotic laser head illustrated in FIG. 2.
Figure 4:
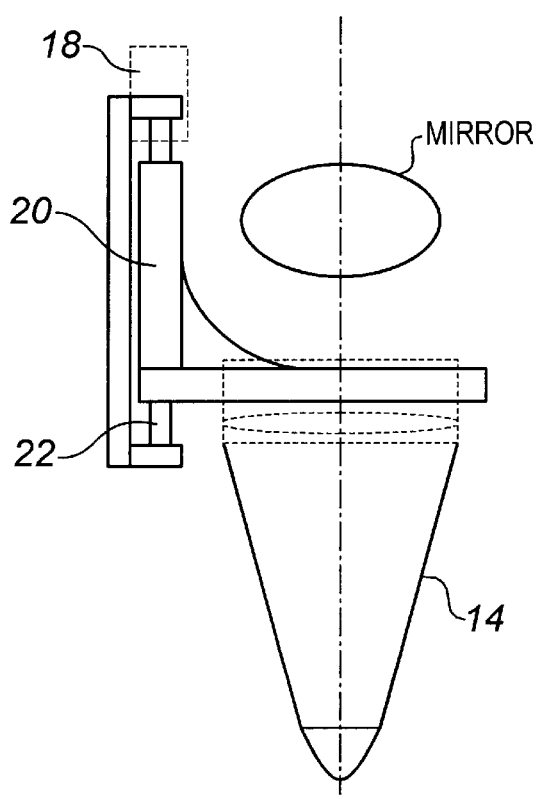
FIG. 4 is a side elevation view, in section, of the second actuator illustrated in FIG. 3.
Figure 7:
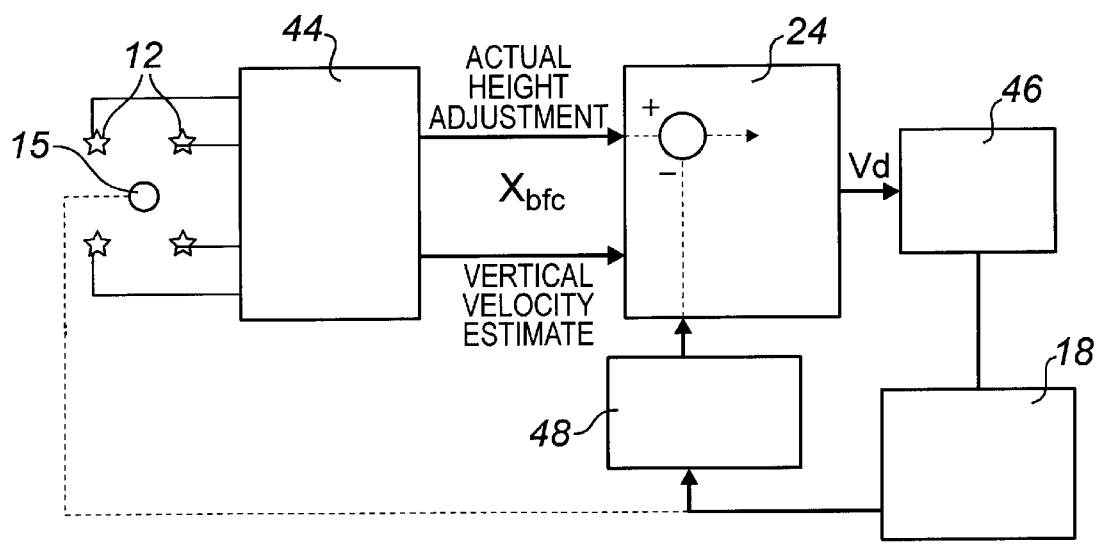
FIG. 7 is a block diagram of the robotic laser head illustrated in FIG. 5.
Figure 8:
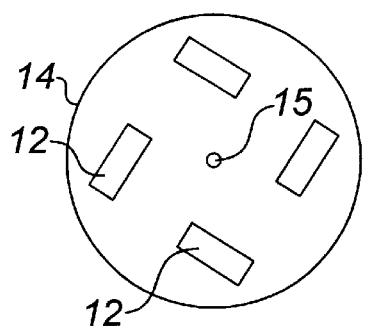
FIG. 8 is a top plan view of a position sensor array from the robotic laser head illustrated in FIG. 5.
Figure 9:
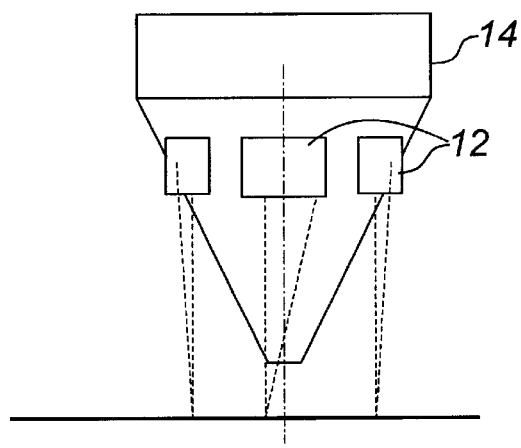
FIG. 9 is a side elevation view of the position sensor array illustrated in FIG. 8.
Figure 10:
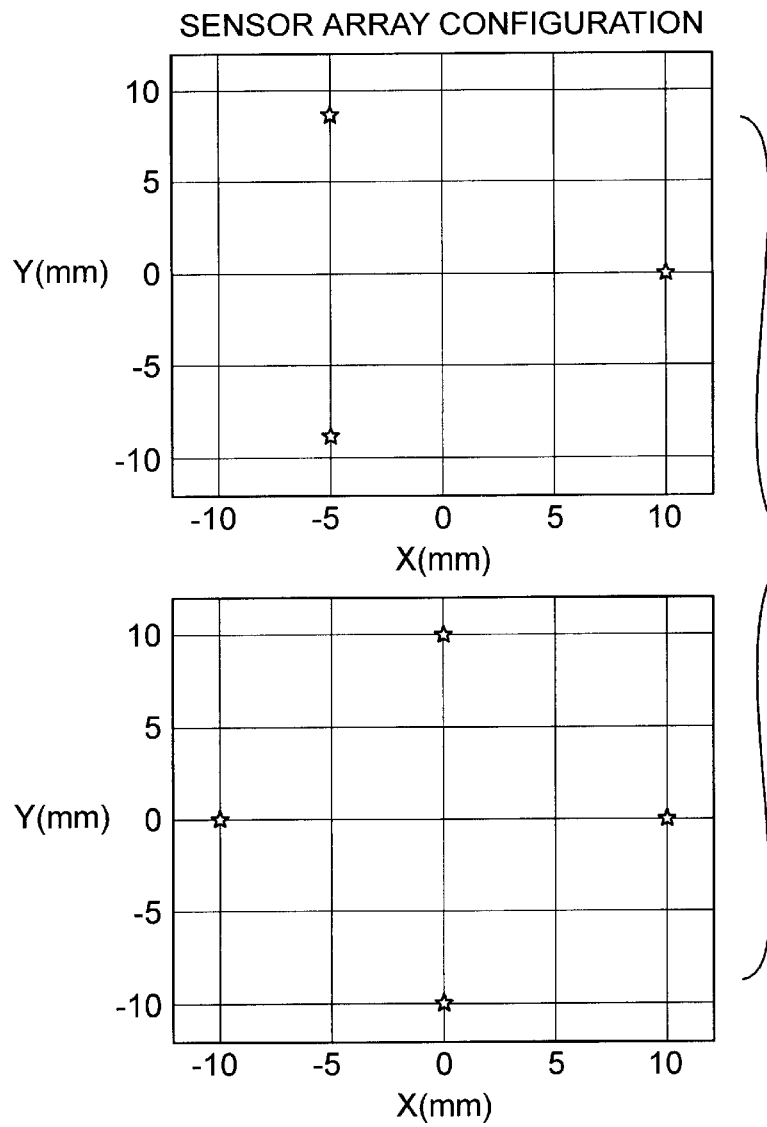
FIG. 10 is a graphic representation of an area map created by the sensor array configuration illustrated in FIG. 8.
Figure 11:
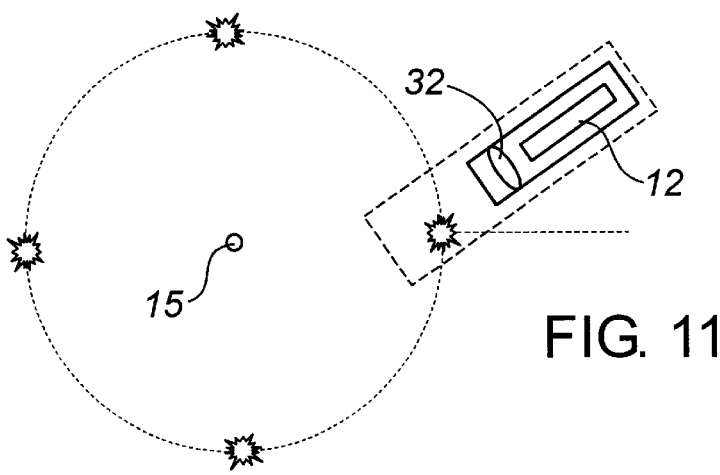
FIG. 11 is a top plan view of the position sensor array for the robotic laser head illustrated in FIG. 5.

Referring to FIG. 1, distance tracking control system includes non-contact distance sensors 12. Referring to FIGS. 8 and 9, it is preferred that a suite or array of non-contact distance sensors 12 be used. Referring to FIG. 2, each non-contact distance sensor 12 is mounted directly onto or in a predetermined relation to a working member, such as a robotic head 14. In FIGS. 2 and 9, non-contact distance sensors 12 are mounted directly onto robotic head 14. Referring to FIG. 8, non-contact distance sensors 12 are mounted in a circumferential configuration surrounding a cutting laser beam 15. This configuration is preferred for the particular application selected as an example which involves laser cutting. Non-contact distance sensor 12 is used for sensing a distance of robotic head 14 from a surface 16. Referring to FIG. 1, an actuator 18 is used for making positional adjustments of robotic head 14 in response to the distance sensed by non-contact distance sensor 12. In order to maintain speed, actuator 18 must be as light weight as possible, while still maintaining the strength necessary to withstand the dynamic forces that are inherent in rapid movement. Referring to FIGS. 3 and 4, one configuration of actuator 18 is shown in which robotic head 14 is mounted onto a carriage 20 that moves along supporting shafts 22. Referring to FIG. 1, a controller 24 is connected to non-contact distance sensor 12 and actuator 18. Controller 24 receives data from non-contact distance sensor 12 and then sends signals to actuator 18 to make adjustments of robotic head 14. Referring to FIG. 5, the preferred technology for non-contact distance sensors 12 involves the use of a laser 26 which emits a low energy light beam. The light beam is collimated through a first lens 28 focused upon surface 16 such that a light spot 30 is projected upon surface 16. Each non-contact distance sensor 12 is a position sensitive light sensor receiving light from a receiving lens 32 focused upon light spot 30 on surface 16. A reflected light spot 34 is projected upon position sensitive light sensor 12. The manner in which this can be arranged in an array is illustrated in FIGS. 10 and 11. Referring to FIG. 1, controller 24 receives data from position sensitive light sensor 12 and then performs distance calculations between robotic head 14 and surface 16 based upon variations in the angle at which reflected light from the laser beam emitted by laser 26 strikes the position sensitive light sensor 12. Referring to FIG. 6, there is illustrated in block form the elements of this sensing system which include a driving circuit 36 to a laser diode 38 and a photodiode 40. Signals from position sensitive light sensor 12 are sent through a conditioning circuit 42 to controller 24. Referring to FIG. 7, the operation is further illustrated. Signals are obtained from non-contact distances sensors 12. Those signals are then passed through an array signal processor 44 which can form part of or be separate from controller 24. From the array signal processing data controller 24 is able to determine an estimated actual height of robotic head 14 from surface 16. Controller 24 is then in a position to send a signal through driver 46 to actuator 18. A position sensor 48 provides data to controller 24 to assist in altering the position of robotic head 14 within the physical limits of actuator 18. As adjustments are made controller 24 uses data from array signal processor 44 to estimate vertical velocity to determine whether the movement can be made in time. If not, the speed that robotic head is travelling parallel to surface 16 must be slowed to ensure that a collision does not occur.

The distance tracking control system described above was designed and developed to have as its primary application to an auto focusing head in automatic laser cutting systems used for cutting limp materials. Materials capable of being cut with such a system include:

textiles natural and synthetic,
fire retarding materials,
fiberglass,
foams,
laminating material,
plastic foils,
carbon fibers,
PVC's,
kevlar,
rubber,
manmade leather,
carpet,
vinyl,
gauze bandages,
paper and paperboards.

Before cutting the material must be spread on the flat cutting bed or on the conveyer belt if cutting in the "on the fly" mode. After spreading limp materials could be bent (since they are usually stored in rolls), warped, or just have "bumps" or ripples. Laser cutting in general does not create thermal effects around cut edges, such as lift up. However, when some parts are cut, right after cutting some warping can occur due to memory effect in most of limp materials (when material was stored in rolls or just fold). This causes problems in laser cutting, because the laser beam is not focused exactly on the surface of the material, and the quality of cut and edges is far from perfect. This problem can be solves by keeping the laser head focused on the surface of the material. In order to do this, the system must be able to track the surface of the material while the laser head is moving along the cutting contour. As will hereinafter be further described, during system design trade-offs must be made.

As described above with reference to FIG. 1, there are three aspects to the system:

distance sensing,
actuation of the focusing head,
control system.

Figure 12:
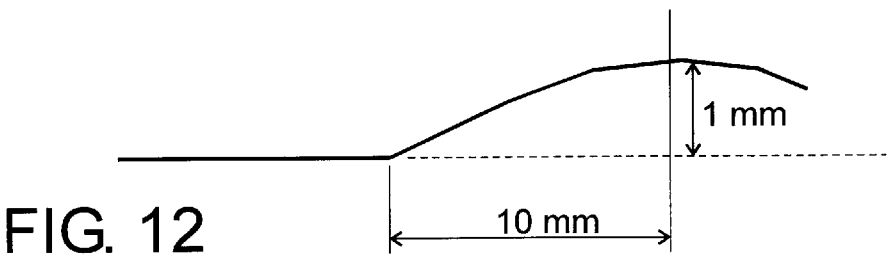
FIG. 12 is a graphical representation of a typical bump in material.
Figure 13:
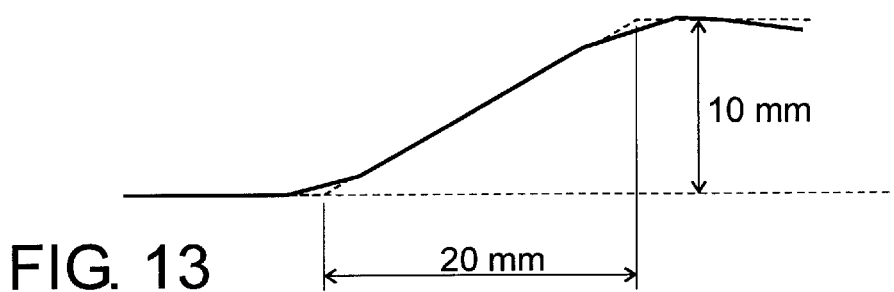
FIG. 13 is a graphical representation of a maximum slope for a bump.
Figure 14:
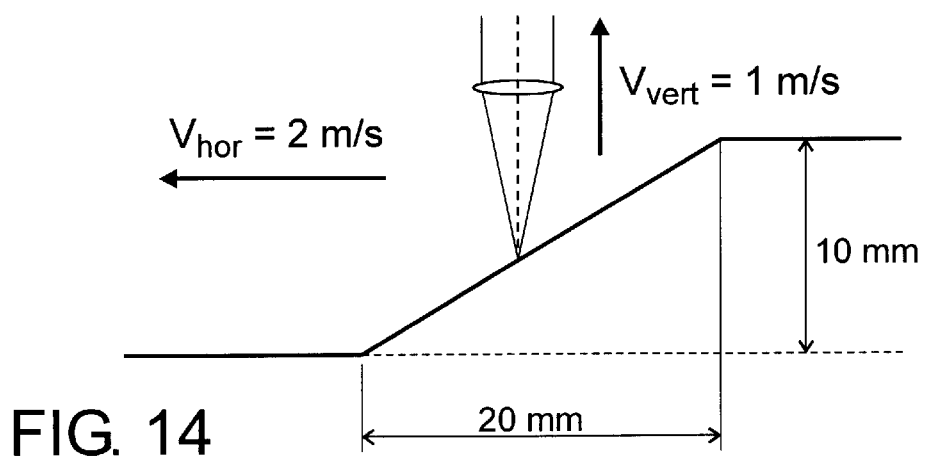
FIG. 14 is a graphical representation of a vertical speed of a robotic laser head.

The system must respond to changes in the fabric surface height. An analysis of the problem will now be provided with reference to FIGS. 12 through 15. Referring to FIG. 12, the system must respond to changes in the fabric surface height ("bump") of 1 mm on the round area with about 10 mm radius (the minimum slope of the fabric is 0.1 mm/mm). If the slope is smaller, the system should not cause any changes in laser beam focus. The absolute maximal height of bumps will be 25 mm. It is not expected to encounter higher waves in spread material. Referring to FIG. 13, The maximum slope of the "bump" will be a 10 mm change in height over a 20 mm change in horizontal distance (slope=½, about 27 degrees). Referring to FIG. 14, the maximum speed of the laser cutting head in horizontal direction (x-y plane) along the cutting contour will be $V_{hor}=2$ m/s. Finally, to keep the quality of cut consistently at the high level, it is important that the distance between the nozzle and the material be constant at all times. As a result, an auto focus actuator must be provided to either adjust the position of the entire laser cutting head or control the vertical position of both laser focusing lens and nozzle tip at the same time.

Sensing must be performed with non-contact method, because of the type of material to be cut—soft cloth, fabric etc. The sensing system has to be immune to changing colour, texture and composition of the material. Distance to the surface will be measured in real time, and ahead of the current cutting spot (focused laser beam). In addition sensing cannot be affected by the brightness and temperature of the laser cutting spot. The sensor should physically fit into the existing laser focusing head nozzle and the sensor weight should be less than 30 grams. The total weight of the sensor and actuator assembly mounted on the cutting head should not exceed 100 grams. This constraint comes from limited acceleration capabilities of the x-y positioning system (ALC 101) of the laser head. Sensing accuracy of better than ±0.2 mm will be sufficient. Sensing resolution in a vertical direction should be about 0.1 mm (0.004 inches). Spatial resolution of the sensor should be better than 2 mm to be able to detect 1 mm of height change on a maximum slope of material (½). This implies, that the minimum sampling rate of the sensor (while the cutting head is moving horizontally with its maximum speed of 2 m/s) will be:

$$Ts=2\ mm/2\ m/s=1\ ms\ or\ 1\ kHz.$$

On the other hand, the vertical velocity of the surface of the material with respect to the head (when the head is moving horizontally with maximum speed of 2 m/s) will be maximum:

$$Vvert=10\ mm/(20\ mm/2\ m/s)=1\ m/s.$$

This is a maximum vertical speed, with which the cutting head must move up and down to track bumps in the material. Since the vertical distance resolution of the sensor is assumed to be 0.1 mm, the minimum sampling period should be:

$$Ts=\text{resolution/vertical velocity}=0.1\ mm/1\ m/s=0.1\ ms$$

or $$fs=10\ kHz.$$

The actuator should physically fit into the existing laser focusing head nozzle and the actuator weight should be less than 70 grams. There is some flexibility in proportion between the weight of actuator and sensor, but it is very important that the total weight of the sensor and actuator assembly mounted on the cutting head not exceed 100 grams. The maximum range of the laser head vertical movement will be 25 mm (the assumed height of maximum encountered bump). Accuracy of the actuator working in a closed control loop should be about +0.2 mm, with repeatability of 0.1 mm.

Figure 15:
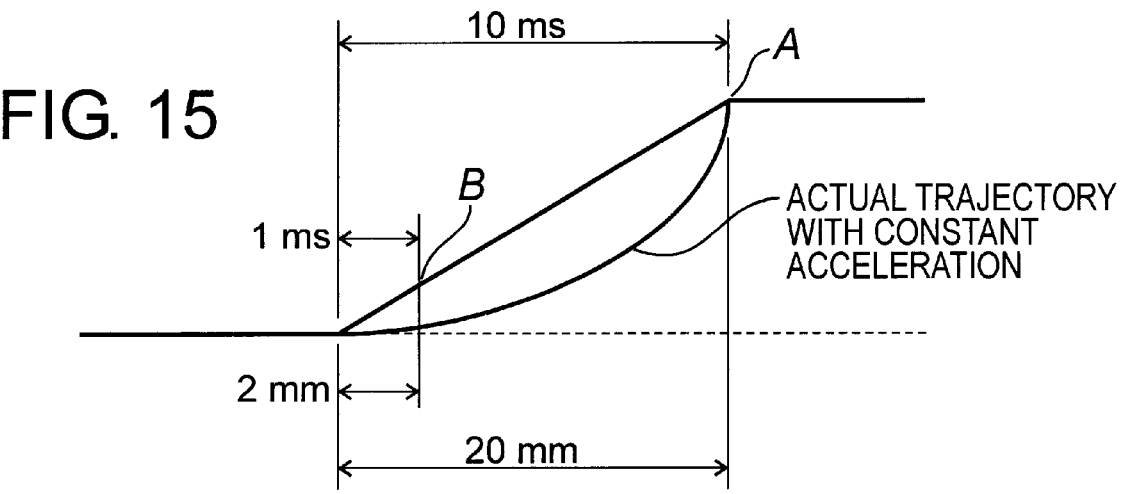
FIG. 15 is a graphical representation of dynamic performance required of an actuator.

Referring to FIG. 15, the dynamic performance required of the actuator in order to accommodate fabric slopes of ½, (while cutting with maximum speed of 2 m/s), the head must move vertically with the velocity of 1 m/s. Therefore, the head must accelerate from 0 (flat fabric) to 1 m/s in a shortest possible time. The actuator achievable acceleration will have direct impact on a dynamic distance tracking error of the entire focus control system, especially when the slope of the fabric changes very rapidly.

Assuming that the laser cutting head moves vertically with constant acceleration to achieve point A (starting from Vvert=0), one can calculate required acceleration:

$$a=2\ d/t^2=2\times 10\ mm/(10\ ms)2=200\ m/s2=20\ g$$

Assuming that the actuator is capable of such enormous accelerations, we can calculate distance tracking error in point B (at 2 mm of horizontal displacement):

desired vertical distance is 1 mm $$\text{actual vertical distance}=a\times t^2/2=200\ m/s2\times(1\ ms)2/2=0.1\ mm.$$

Thus, the tracking error is $$(1\ mm-0.1\ mm)/1\ mm=0.9=90\%.$$

It is easy to calculate that to achieve good tracking at point B, acceleration of 2000 m/s2=200 g will be required. It follows from these calculations that significant trade-offs must be made in this regard, because achieving accelerations even of 20 g might be very difficult.

Closed loop laser beam focus control system must provide distance tracking with accuracy minimum ±0.2 mm. Such accuracy should be achieved under assumption that the head is moving horizontally at 2 m/s. The control system should be able to track sinusoidal profile of surface at frequencies of about 15 Hz without a significant phase shift. This number was calculated for a maximum horizontal speed and amplitude of the vertical movement of 12.5 mm. To satisfy this requirement the closed loop control should have bandwidth at least 150 Hz. If a digital control system (microprocessor driven) is chosen, a sampling frequency should be above 10 kHz to meet dynamic tracking requirements. Physical size and weight of the controller is not very crucial, because it can be installed outside of a fast moving cutting head. Important from the commercialization point of view will be the controller complexity and its manufacturing cost.

The ultimate goal of the system is to make the best quality cut in the shortest period of time. Due to very high acceleration requirements, ie. 200 g, for an actuating device (to track the fabric profile with appropriate accuracy) it might be necessary to slow down the cutting speed of the laser head, when a bump is encountered. At the same time, the laser power should be reduced appropriately to keep high Quality cut. Therefore, the focus control system should have interface to both laser cutter motion control system and to laser power control. It will be acceptable that the auto focus system will communicate with the laser (power level) through a positioner control system. If for any reason the overall system cannot guarantee a quality cut, the laser head movement should be stopped and laser power turned off.

The operator will then make a decision what to do next.

It is estimated that the overall cost of the auto focus laser head system should be in the range of $3,000, that is split between components as follows:

| | |
|---|---|
| sensing assembly | $500, |
| actuator | $1,000, |
| controller | $1,500. |

Currently most commonly used fabric laser cutting systems utilize 200 W to 500 W power lasers combined with lenses of 125 mm (5") focal length. The need to increase productivity drives the trend to increase cutting speed. A significant increase of cutting speed can be achieved either by using higher power lasers or by reducing focal length of the laser focusing lens. In order to increase cutting speed twofold, the laser power should be also approximately doubled. This would significantly increase the cost of the system. For example;

a 200 W CO2 laser costs about $60,000, but a 500 W CO2 laser will cost over $100,000.

The other way to increase cutting speed is to use focusing lenses with shorter focal length without necessity to use higher power lasers. For example utilizing a 62.5 mm (2.5") lens instead of 125 mm will result in about four times greater concentration of energy at the cutting spot. This will enable to increase cutting speed theoretically four times and practically about three times. The problem is that in this case the system will be unable to accommodate such high bumps in materials as before. This problem, however, will be alleviated by using auto focus control system. Switching to the 62.5 mm focusing lens will result in savings of about $40,000 in laser cost, plus about $2 per hour in operating cost, that is about $4,000 per year. Therefore, market should be able to absorb the cost of auto focusing laser cutting head in the range of $10,000 to $15,000. In addition to these savings, the new auto focusing laser head will increase quality and flexibility of laser cutting technology, and will also allow to use laser cutting technology in many new areas such as for example cutting variable thickness materials.

Described above are the preferred embodiments in the three critical areas of sensing, actuation and control. There are, however, alternative solutions that will now be reviewed and described.

Distance Sensing

Figure 16:
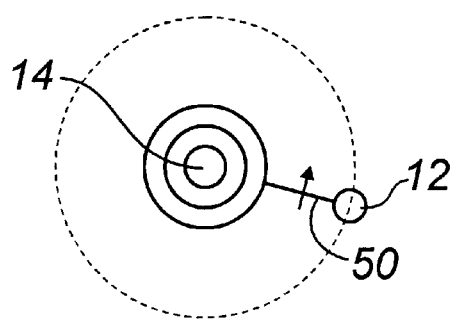
FIG. 16 is a top plan view, in section, of a rotating distance sensor.

Referring to FIG. 16, one non-contact distance sensor 12 will be mounted on a rotating arm 50 with a robotic laser focusing head 14 in the centre. Such a sensor will scan the distance to the fabric in a circular pattern. Information about the actual size of bumps on the material will be extracted by software resident in the controller. It could be either entire map of the area covered by the sensor (within the radius of rotation) or only a profile of the distance along predicted trajectory of the laser cutting head.

Figure 17:
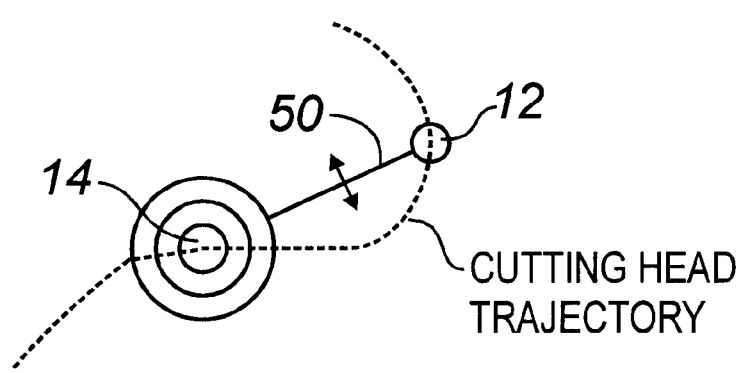
FIG. 17 is a graphical representation of looking ahead sensing for the rotating distance sensor illustrated in FIG. 16.

Referring to FIG. 17, one non-contact distance sensor 12 is mounted on a rotatably mounted arm 50 as in FIG. 16, but here the angular position of the arm 50 is servo controlled, and the actual angle is set according to future direction of movement of robotic cutting head 14. Data about the distance between the head 14 and the material is generated by the sensor 12 along the cutting path.

Figure 18:
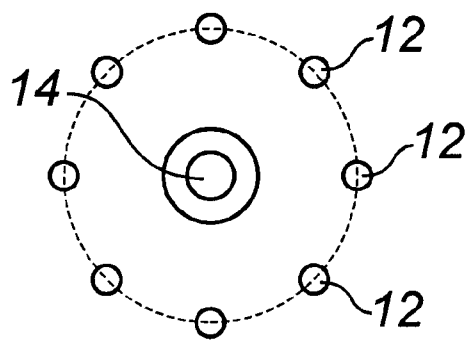
FIG. 18 is a top plan view, in section, of a distance sensor array.

Referring to FIG. 18, an array of non-contact distance point sensors 12 is installed stationary with respect to the cutting head 14. Particular sensors 12 are distributed evenly around the cutting head 14. Data processing might be similar to FIG. 16 (generate a map) or use only one sensor measurement for that sensor under which the cut is to be made.

Figure 19:
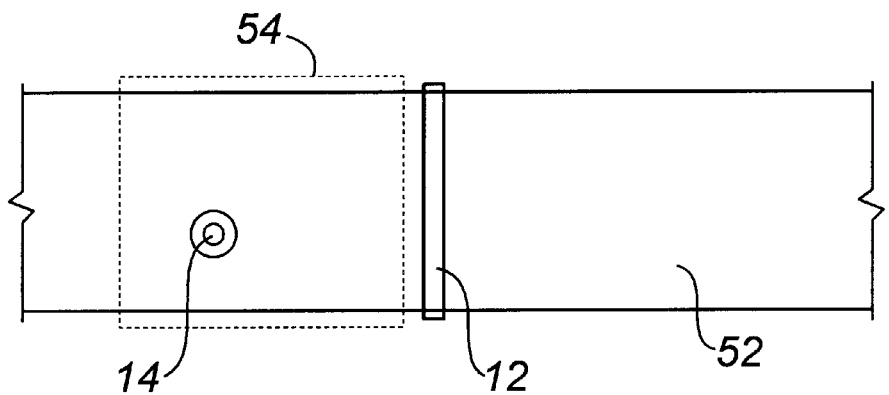
FIG. 19 is a top plan view, in section, of a linear distance sensing.

Referring to FIG. 19, non-contact distance sensor is a linearly scanning distance sensor 12 located over a conveyor belt 52 just before the material enters a cutting area 54. The scanning width should be equal to the material width, and the entire map of bump and wrinkles should be memorized by the system. When head 14 approaches a particular area of the spread material, an appropriate distance data will be extracted from the memory, and focus of the laser cutting head adjusted accordingly.

Figure 20:
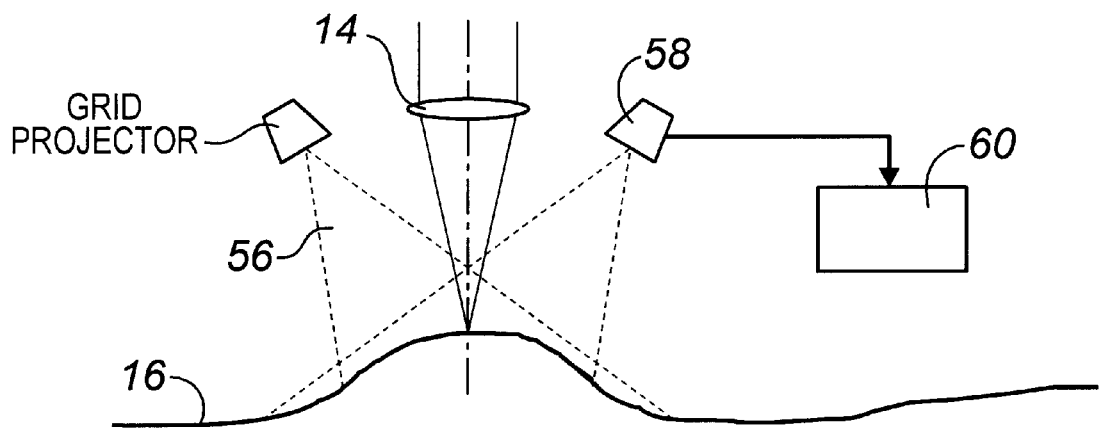
FIG. 20 is a side elevation view, in section, of 3 dimensional distance mapping.

Referring to FIG. 20, project a predefined grid of light 56 on a fabric surface 16, capture that image with a video camera 58 and use image processing 60 to find a 3D map of the surface 16 in the vicinity of laser cutting head 14.

Laser Focusing Head Actuation

Laser focusing head actuation can be implemented utilizing either continuous movement or stepwise. The first method allows changing vertical position of the head or its parts in a continuous manner, so that the focal length can be adjusted with a very high resolution. In the second method a digital concept is used. The focusing lens has a predetermined number of vertical positions that the lens can be "latched" in. Experience in laser cutting showed that it might be sufficient to have about ten levels to achieve a good quality cut. The following paragraphs describe and illustrate possible concepts for laser focusing lens actuation.

A) Continuous Methods

Figure 21:
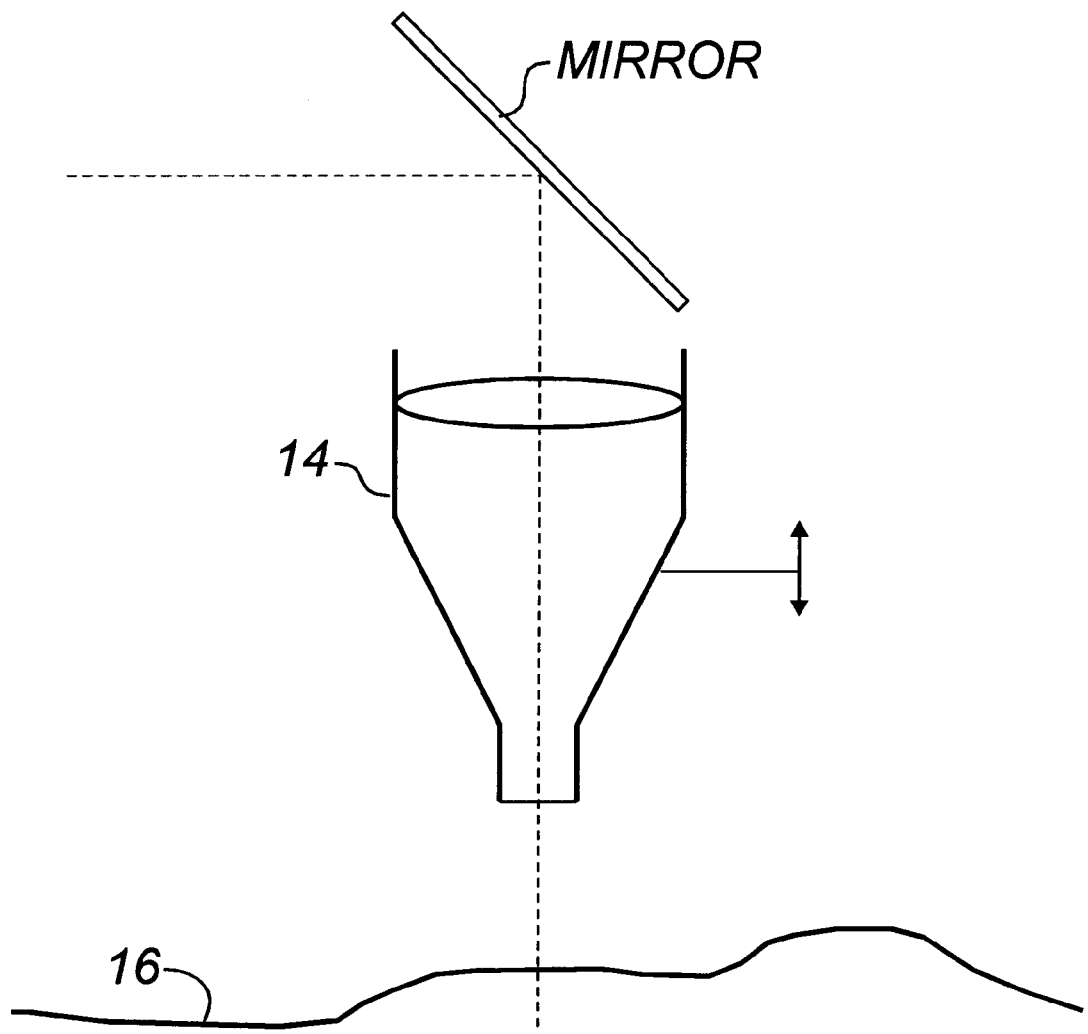
FIG. 21 is a side elevation view, in section, of movable a robotic laser head.

Referring to FIG. 21, moving the entire robotic head assembly 14 up and down.

Figure 22:
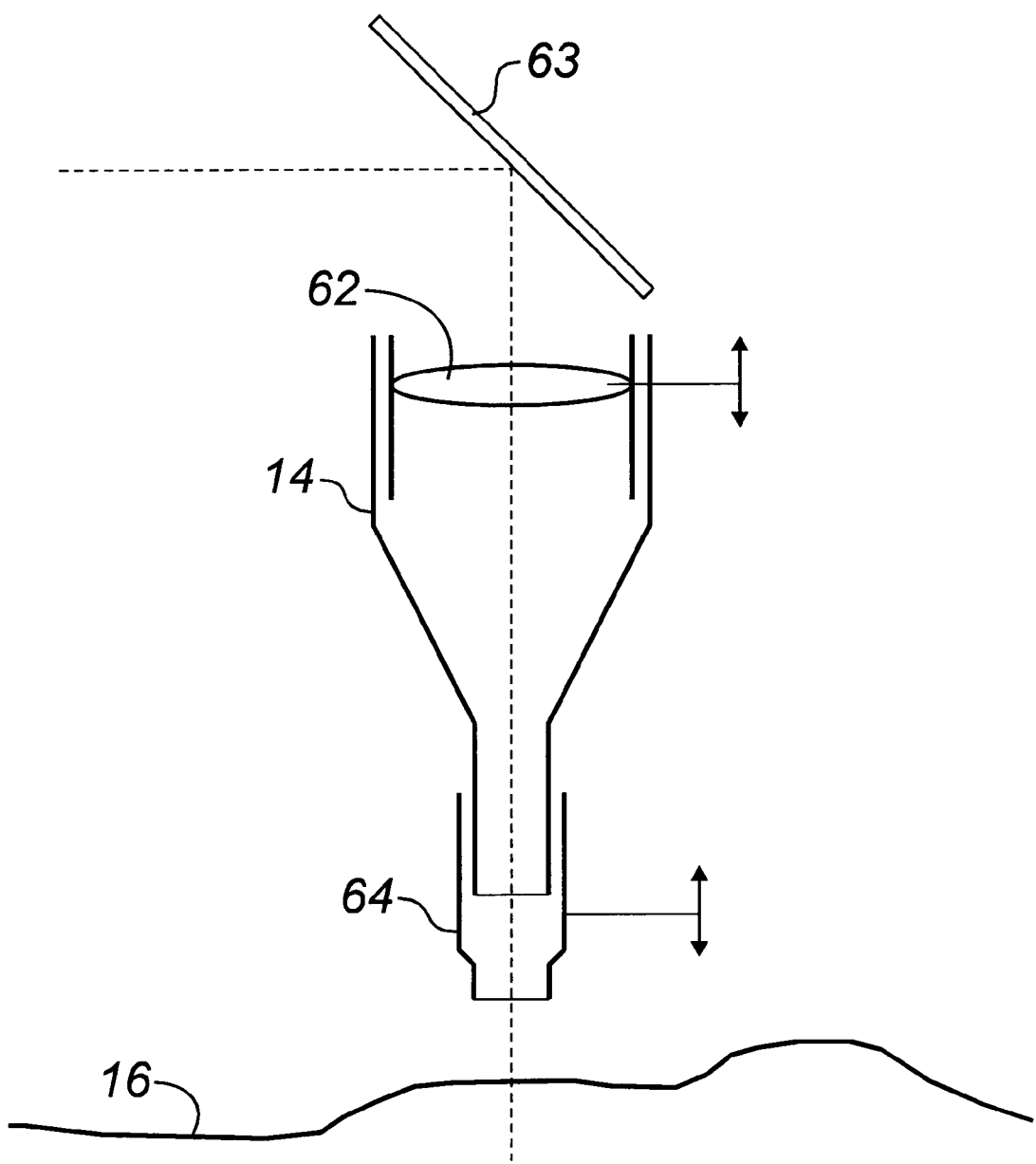
FIG. 22 is a side elevation view, in section, of a robotic laser head having relatively movable actuating lens and nozzle tip.

Referring to FIG. 22, adjusting the position of the focusing lens 62 in relation to mirror 63, and simultaneously moving the nozzle tip 64.

Figure 23:
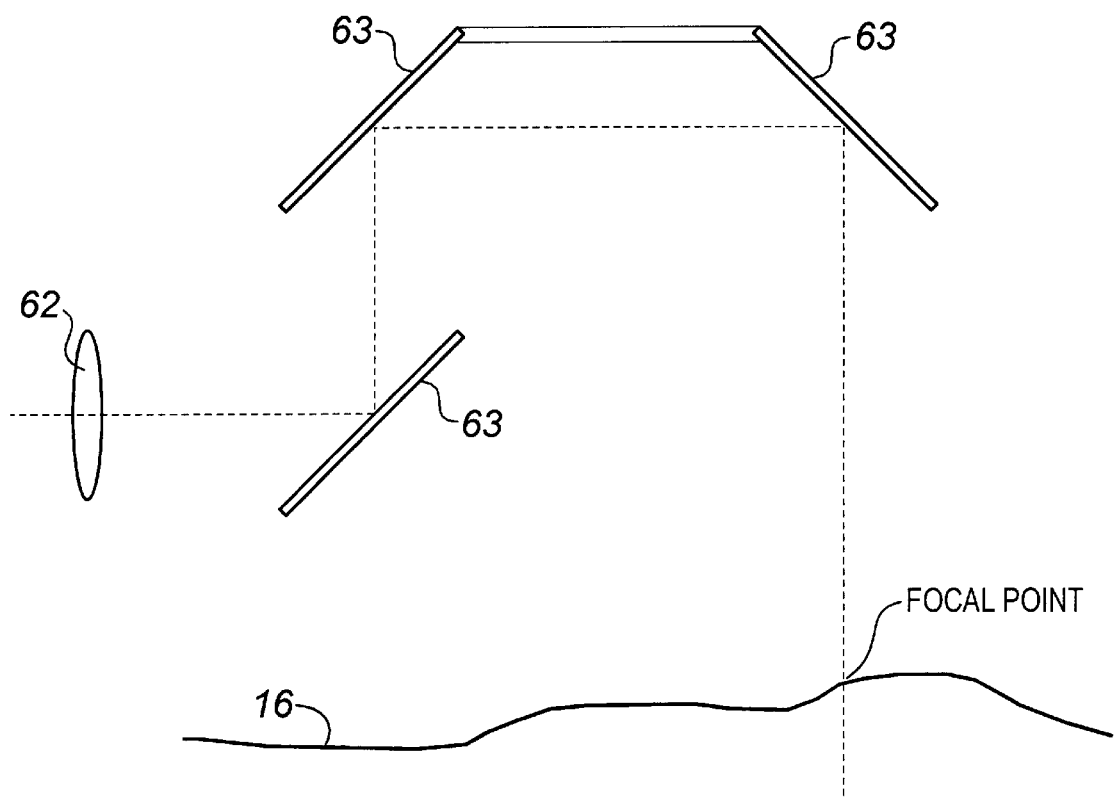
FIG. 23 is a side elevation view, in section, of a actuating mirror configuration.

Referring to FIG. 23, moving a system of perpendicular mirrors 63 to change the length of the laser beam optical path behind the focusing lens 62. If this solution is selected, the head must have two actuators: one for mirrors 63 and the second for a nozzle tip (not shown) that must also be moved.

Using lenses with electrically controlled focus capabilities. This would be the perfect solution, but the technology is still in the research stage.

B) Stepwise

The same methodology will be used as illustrated in FIGS. 21 through 23, but the position of the moving assemblies will have a number of fixed focal positions, for example 10 levels, 2.5 mm apart.

Figure 24:
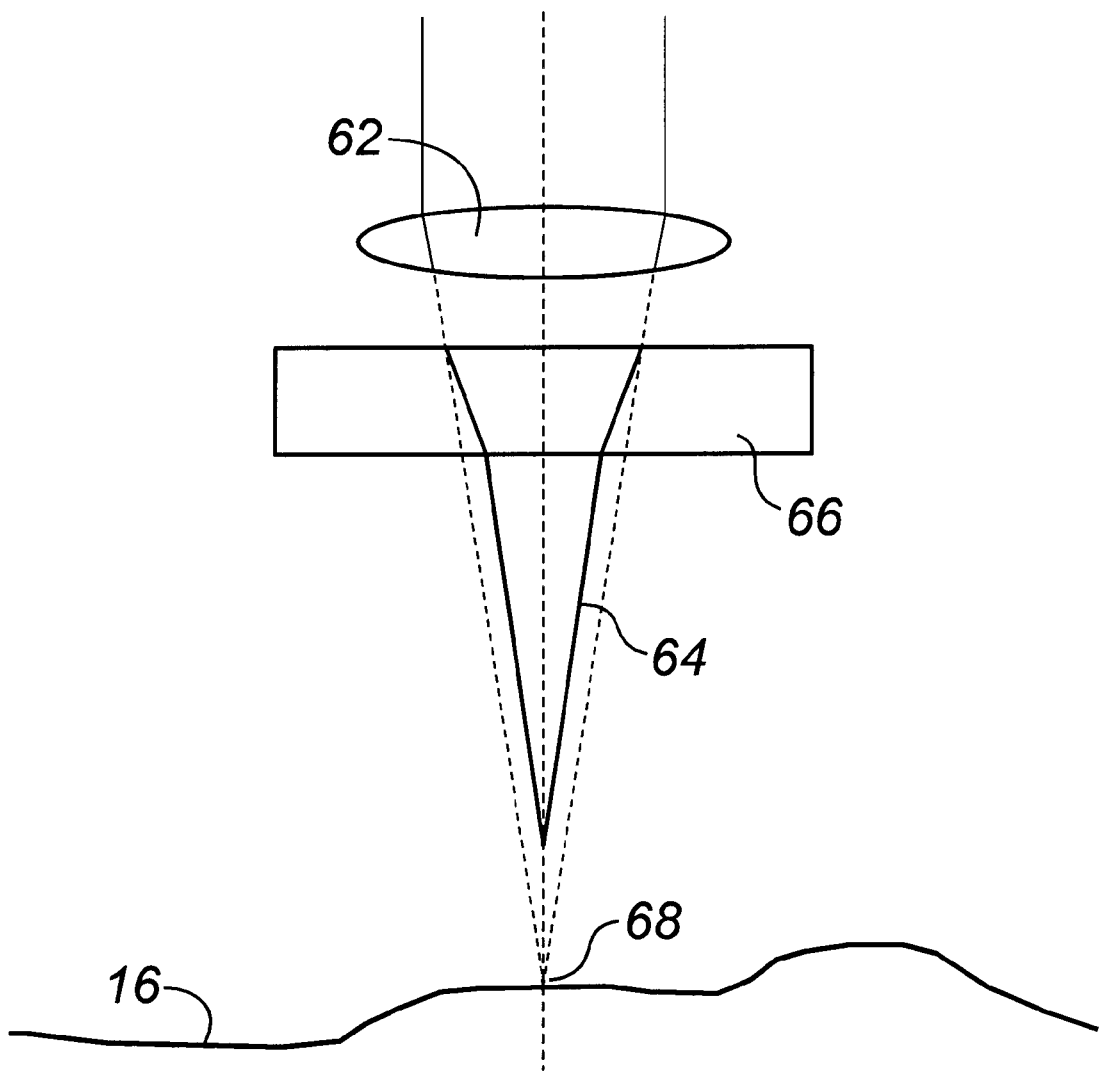
FIG. 24 is a side elevation view, in section, of a changing optical path.

Referring to FIG. 24, inserting plates 66 with different optical thickness between the lens 62 and a focal point 68 on surface 16. This would also require actuation of nozzle tip 64.

Auto Focus Control Concepts

This section describes briefly three control concepts for the auto focus laser cutting head. These concepts rely on different information that might be delivered by sensors and the cutting system controller 24 (ALC 101) to an auto focus control unit. The auto focus controller will generate control action having the following possible distance data at its input:

distance information along the cutting head trajectory, 3D map of the area surrounding cutting head, estimated current distance at cutting point.

The control concepts based on different sensory information are illustrated next.

Figure 25:
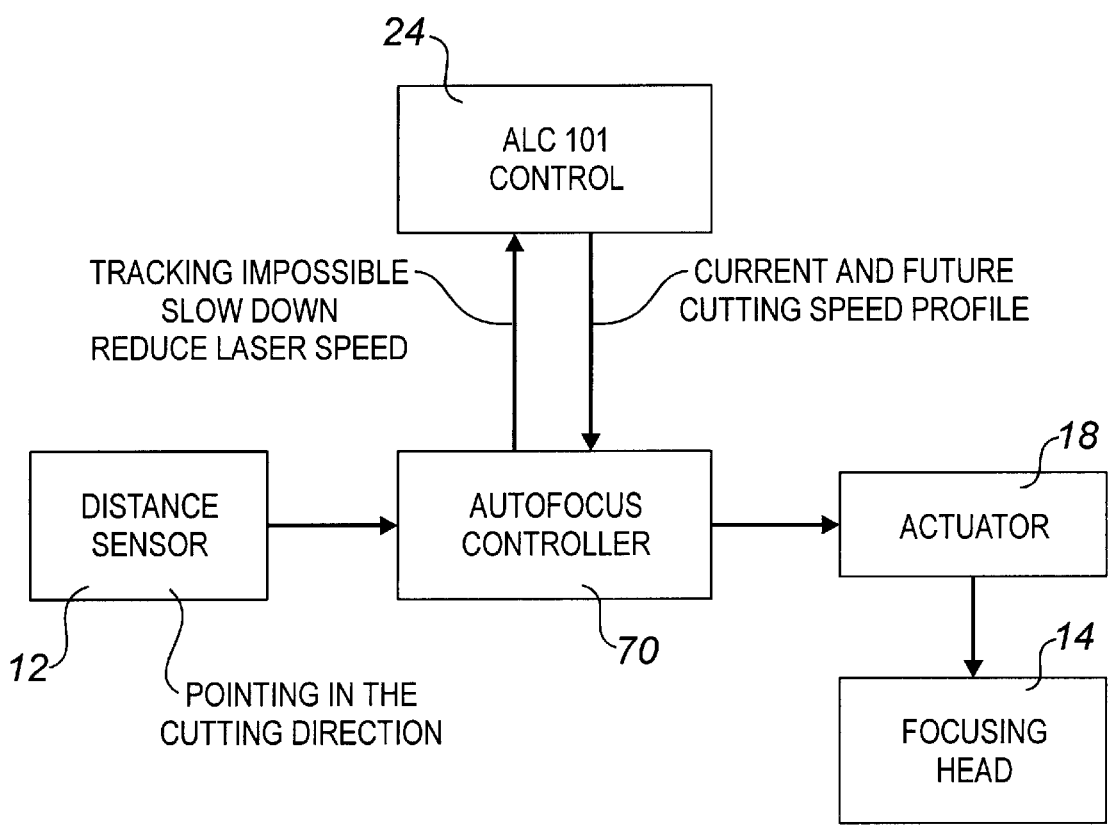
FIG. 25 is a block diagram of a control concept based upon distance along head trajectory.

Referring to FIG. 25, control based on distance information along the cutting head trajectory involves controller 24 with an intermediate autofocus controller 70. Input to from non-contact distance sensor 12 is channelled to controller 24 through autofocus controller 70. Output from controller 24 to actuator 18 and focusing head 14 is similarly channelled through autofocus controller 70.

Figure 26:
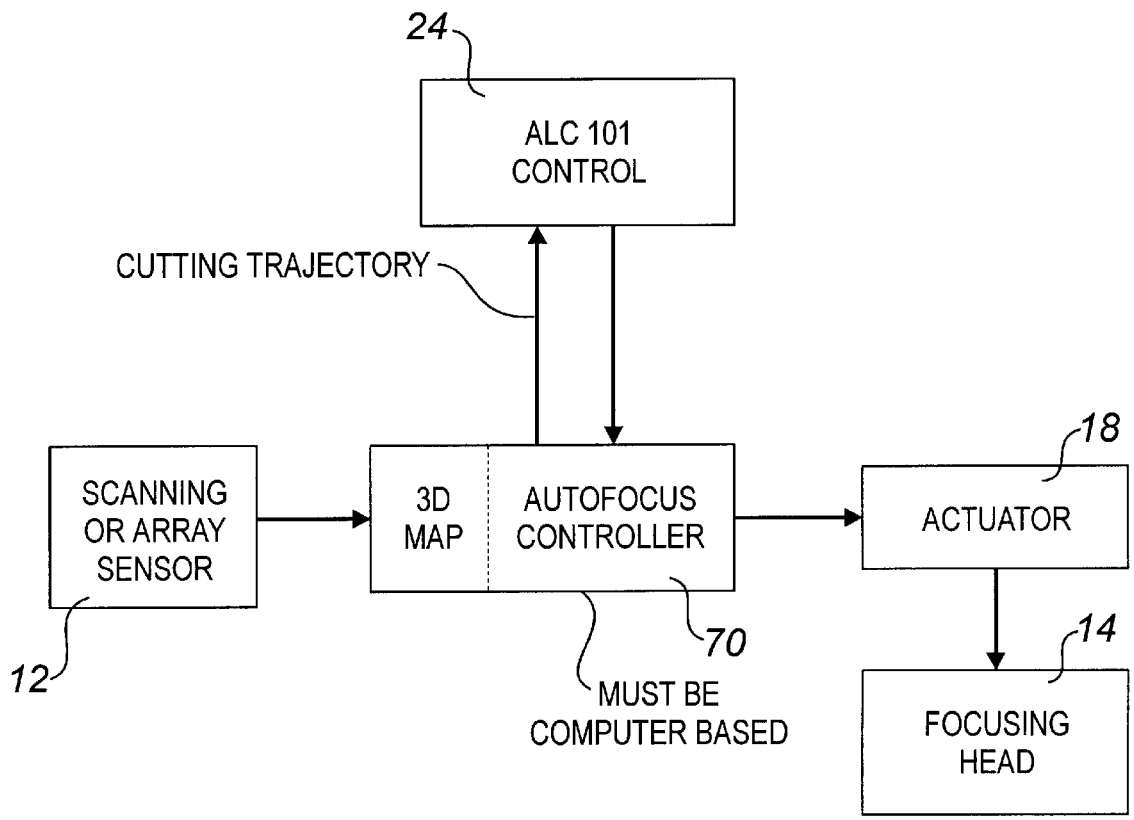
FIG. 26 is a block diagram of a control concept based upon 3 dimensional mapping.

Referring to FIG. 26, control based on 3D map of the area surrounding the cutting laser beam. This configuration is similar to that illustrated in FIG. 25, except that the data received from non-contact scanning sensor or non-contact sensor array 12 is used by autofocus controller 70 to make a three dimensional map.

Figure 27:
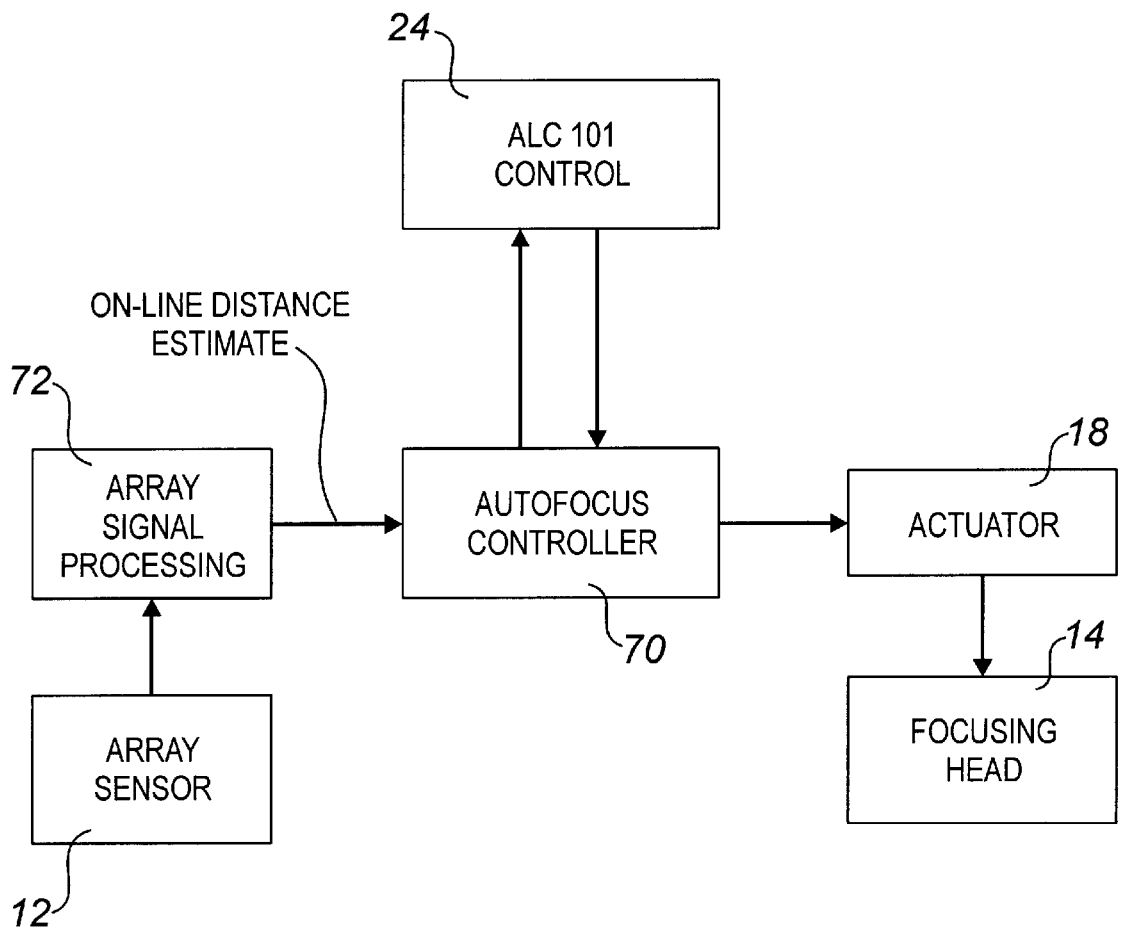
FIG. 27 is a block diagram of a control concept based upon distance estimating.

Referring to FIG. 27, control based on estimated actual distance at cutting point. This configuration is also similar to that illustrated in FIG. 25, except that the data from non-contact sensor array 12 is channelled to autofocus controller 70 through an array signal processing unit 72.

Sensing

Review of distance sensing methods showed that they can be generally divided into three general categories with increased level of sophistication:
point sensors
array sensors, and
3D sensors.

Point sensors are able to measure the distance to only one particular point on the surface of an object. In order to make a profile of the surface, such sensor must be mechanically redirected to other points.

Array sensors are usually composed of a number of point sensors and are capable of measuring distance to several points on the surface at the same time. Geometrically the sensors can be arranged in straight line or other configurations. Functionally the same effect can be accomplished by using scanning technique and one point sensor. However, the speed of operation for scanning sensors is much lower than for array sensors.

The third category, called 3D sensors, include structured light vision technique, where predetermined pattern is projected on an unknown surface and a video camera and image processing techniques are used to generate a 3D map of the surface.

Based on physical principle of operation distance sensors can be classified into the following groups:
working on magnetic fields (inductive),
based on changing capacitance,
ultrasonic,
laser light.

The first two groups are not suitable for use with fabric materials, because fabric materials are not detectable by electromagnetic fields. Ultrasonic sensors have been also ruled out because soft fabric does not reflect ultrasound very well. The last group of distance sensors that operates on laser beam reflection principle seems to best suitable for the project. There are three ways to measure distance using reflected laser beam:
time of flight,
modulation, and
triangulation.

Sensor based on time of flight measurements work well only for larger distances, usually much larger than 1m, so they are unsuitable for cutting of fabrics. On the other hand, sensors that work on phase difference of modulated laser light are very good for small distances. Unfortunately, such sensors are complex and very expensive.

The most cost effective sensors, are sensors based on the principle of triangulation. They are suitable for small distances, are light weight and relatively inexpensive. A major drawback of these sensors is that they generate significant errors for sharp edges, but it will not be a problem for fabric spread on flat table.

Finally, there is a new distance sensing technology developed by Lawrence Livermore National Labs, called Micropower Impulse Radar (MIR). As this technology is more fully developed, it might become a viable alternative.

Actuation

The ultimate goal of the auto focus system is to adjust the vertical position of laser focusing lens to keep laser beam focused on the surface of the material. Thus, the lens actuation mechanism must be driven by an appropriate actuator. Most known technologies were developed either for use in auto focus cameras or for positioning recording/reading heads in VTRs and CD drives. The technologies for auto focus cameras are too slow for this application and do not provide required accuracy. Solutions developed for actuation recording/reading heads provide adequate accuracy, due to very low mass of the head they are unsuitable for a laser cutting auto focus head.

Review of available actuators showed that there are three groups that could be potentially utilized to move focusing lens actuation mechanism. They are:
motor driven,
piezoelectric, and
electromagnetic.

Figure 28:
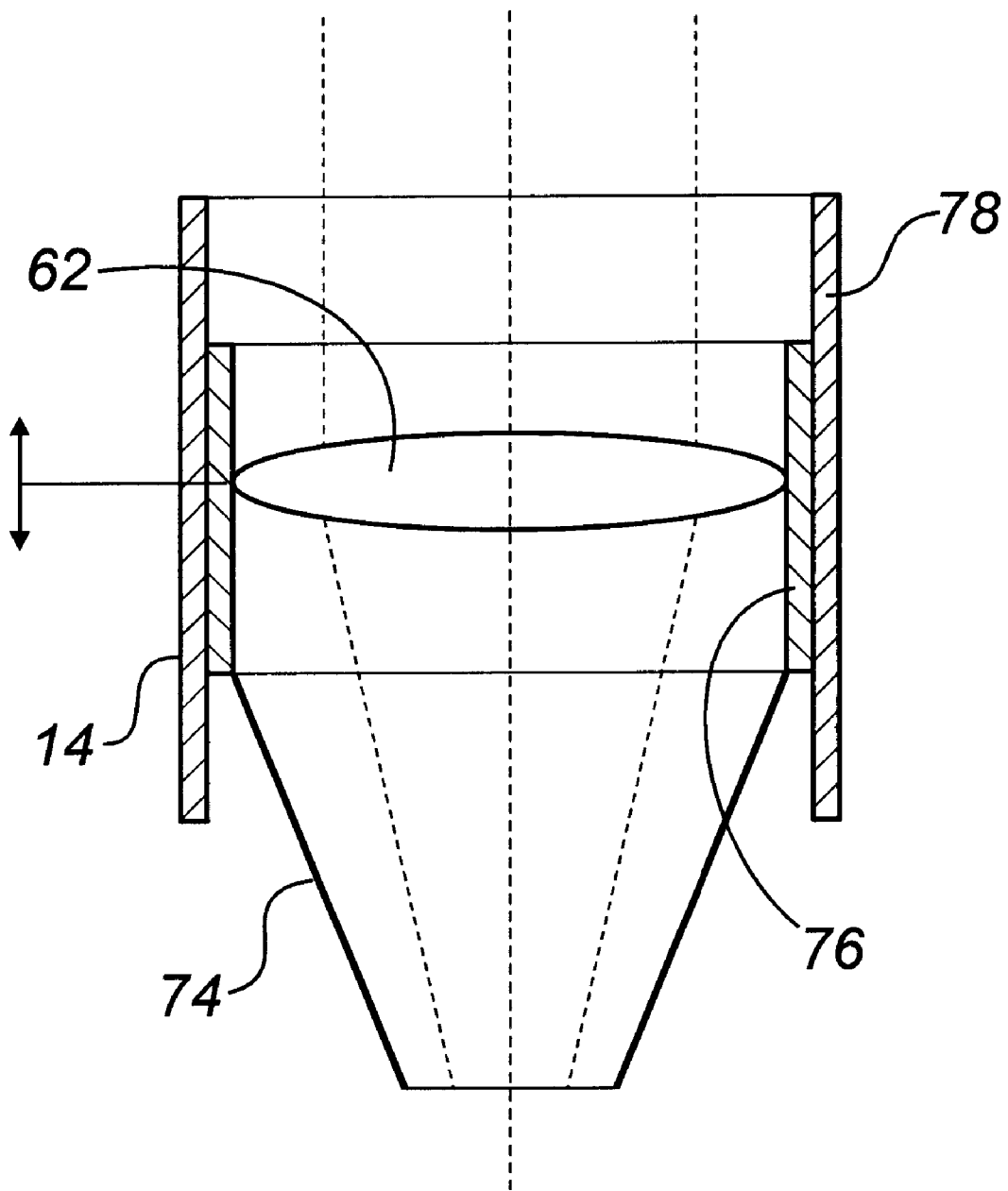
FIG. 28 is a side elevation view, in section, of a moving coil actuator.

Utilization of motor driven actuation method appears to be ruled out due to relatively large mass and slow speed of operation and low accelerations. Piezoelectric actuators provide significant forces, but they are expensive, heavy and require very complex driving circuitry. The most promising solution of the actuation problem of the laser focusing lens seems to be utilization of electromagnetic principle (moving coil actuators or voice coil actuators), as illustrated in FIG. 28. The actuators have a moving head 74 to which is mounted focusing lens 62. The interaction between a coil 76 and a magnetic housing 78 results in movement of moving head 74.

Control

There were no "general purpose" control devices that could be purchased and integrated in this system, even with some modifications of control laws and algorithms. There are, however, some concepts of control methodology, such as inclusion of position and speed estimating observers, that might significantly improve dynamic performance of the controller. These estimating observers will use Kalman filtering techniques.

Preferred Design

The most suitable solution for distance measurement seems to be an array of non-contact distance point sensors 12, as illustrated in FIGS. 8 and 9, the are be fixed to the laser beam focusing head 14. The number of distance point sensors will be in range of 4 to 8 installed evenly around the tip of the focusing head. The array of sensors will be able to detect the distance to the fabric around the laser cutting point.

The idea of using a single distance sensor on rotating arm would be very difficult to implement due to the design complexity and excessive mass of the servo. In addition, when continuous scanning method is used, a very heavy computational burden will be put on the sensor signal processing module.

The linear scanning distance sensor located over the conveyor belt well ahead of cutting head would scan the profile of the material prior to entering into the cutting area. This solution would not provide an actual topographical map during the cutting. The dynamics of the conveyor movement and a material memory effect can change distribution and height of bumps between the sensing line and cutting area.

Finally, pattern projection combined with image processing techniques to find a 3D map of the area to be cut is viewed as being too bulky, too slow and too costly.

The array of accurate point distance sensors is the best solution of the distance sensing problem for the purpose of integration into laser cutting head. Laser point sensors available on the market meet all technical requirements except size and weight. It will be necessary to design and develop "custom" sensors consisting of laser diodes and position sensitive detectors (PSDs) available off the shelf, modelled on the embodiment illustrated in FIG. 5. It is expected that this will provide a generic solution for distance sensing that could be used in all areas of robotics.

Laser Beam Focusing Head Actuator

Figure 29:
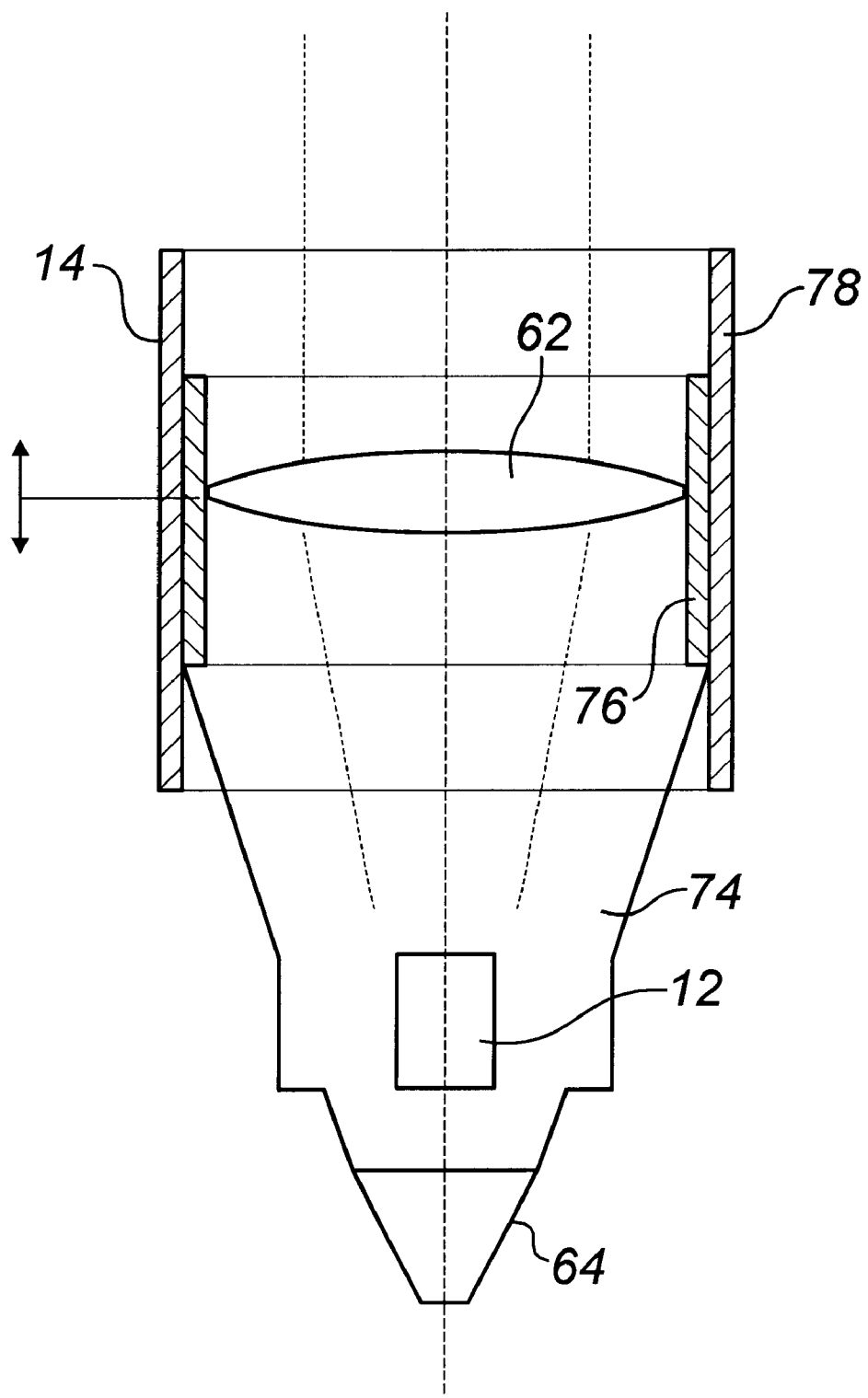
FIG. 29 is a side elevation view, in section, of a auto-focus robotic laser head.

Out of the possible concepts of laser cutting head actuation described, moving the entire focusing head, as illustrated in FIG. 21, will be the most preferable solution. Referring to FIG. 29, the servo actuator for the head will be based on electromagnetic principle i.e. moving/voice coil. Moving coil actuators have the best mass and acceleration characteristics, and generate relatively long strokes. The embodiment illustrated in FIG. 29, is the same as that illustrated in FIG. 28, except there has been added to the figure a nozzle tip 64 and sensor array 12.

Other alternative solution to moving coil, piezoelectric actuators are heavy, have short range of movement, and require specially designed drivers.

Miniature servo motors have poor mass and acceleration characteristic and would require gear boxes and additional driving mechanism. Adjusting the position of he focusing lens and the nozzle tip separately would require two actuators. Embedding two servo mechanisms in a small laser cutting head would significantly complicate mechanical design, that will make the system very expensive.

The concept of changing the length of the beam behind the focusing head would require the development of the special optical devices (mirrors and lenses).

Voice/moving coil actuators are direct drive motion devices that utilize a permanent magnet field and coil winding conductor to produce a force proportional to the current applied to the coil. These non-commutated electromagnetic devices are used in linear motion applications requiring linear force and acceleration at high frequency rate. Originally used in loud speakers, moving/voice coil actuators are successfully utilized in applications where direct high frequency drive with tight servo control is necessary. Voice or moving coil actuators have excellent force vs. travel characteristics, low electrical and mechanical time constant, and high electrical to mechanical energy conversion rate. They are cog-free, hysteresis-free, these attributes result in smoothness and controllability that make the voice coil an ideal device for use in linear motion where speed and accuracy at high frequency respond is curtail. They do not, require complex mechanical drives and gear boxes. The servo control has usually a close loop system with a speed and position feedback.

To maintain constant distance of the focusing head to the surface a cylindrical moving/voice coil will most likely be utilized. The focusing lens and nozzle assembly will be attached to the coil and the surrounded hollow magnet will be attached to the Y axis carriage.

Control System

The proposed control system will be most likely based on DSP processor technology. The controller will be a self-contained unit, that will monitor distance, make topographical map, interact with the laser cutter motion controller, and generate control signals for, driving the actuator to maintain constant distance between the laser cutting head and a limp material.

It is anticipated that a single board generic control system will be either adopted or developed. This control board will have capability to interface to motion controller of the ALC 101 system of RD Corporation.

Auto-Focus Head Conceptual Design

The total weight of the head illustrated in FIG. 29 is 100 g. The focusing head is attached to the Y axis carriage of a robotic arm by a bracket. In the proposed conceptual design an array of distance sensors 12 will be embedded around the nozzle 64 at about 30 mm from material surface. The number of sensors will be between 4 and 8, and the sensors will be spaced evenly around the nozzle. The total weight of all sensors with wires will not exceed 20 g.

A voice/moving coil will actuate the focusing lens and nozzle to maintain a constant distance to the surface of the material. The moving part 74 of the focusing head 14 will consist of a coil 76, a lens 62, and a nozzle tip 64 with embedded sensors 12. Moving coil 76 will embrace the lens and nozzle assembly. The second part of a moving coil actuator—a cylindrical magnet 78 will fasten to the supporting bracket of the Y axis carriage. The magnetic forces caused by electric current flowing through the coil will maintain the focusing head 74 in the desired vertical position. When changes in the distance to the material are detected by the array of sensors 12, the sensor signals processed by a control microprocessor will generate driving signals for the moving coil that in turn will actuate the focusing head to the desired vertical position so that the laser beam is focused exactly on the surface of the material.

A voice coil actuator mass should be about 80 g. The controller and signal processing boards will be located outside the positioning table preferably in the control cabinet. All the wires connecting sensors and moving coil will run through a cable carrier. The body of auto focusing cutting head will be made of aluminum or titanium.

System Conceptual Design

Figure 30:
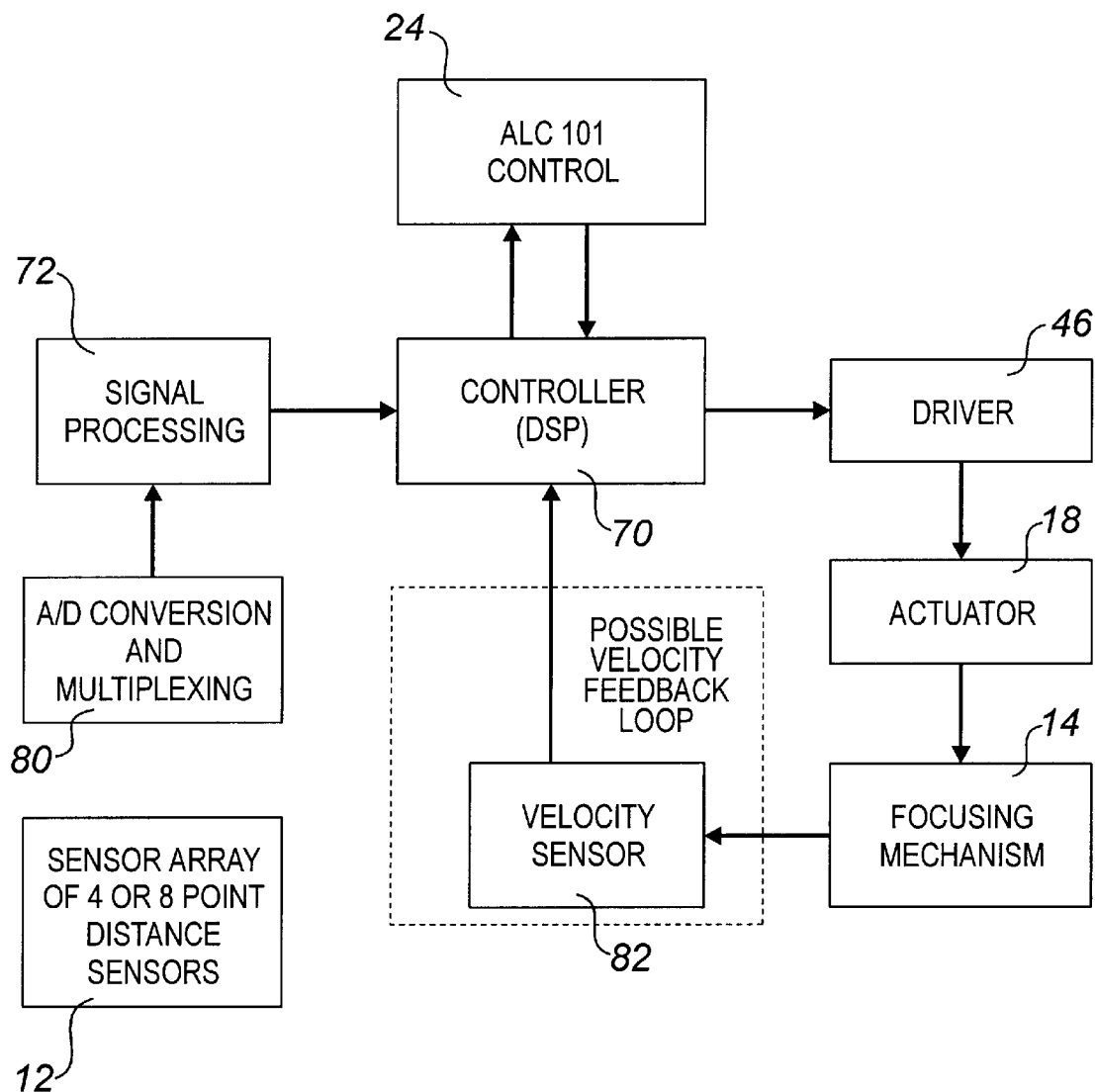
FIG. 30 is a block diagram of an auto-focus system for the auto-focus robotic laser head illustrated in FIG. 29.

The concept of the control system for the auto focus laser cutting head is illustrated in FIG. 30. Signals from sensor array 12, after digitizing and multiplexing in a conversion unit 80, are processed by a signal processing unit 72. The processing will include either generation of a 3D map of the area surrounding cutting beam or an estimation of current distance from the head to the material at the laser cutting point. The auto focus controller 70 will then take appropriate information from the signal processing unit 72 and generate a dynamic signal for the driver 46 to move the actuator 18 of the head focusing mechanism 14. Control law will be designed to meet the closed loop bandwidth requirements of the system. At this time it is anticipated that the controller will be implemented using one of the DSP chips or motion control boards. Signal processing functions might be implemented utilizing the same DSP chip as the controller. However, if a real time performance of both control and signal processing algorithms implemented on one processor appear to be unsatisfactory, a separate processor will be used for signal processing functions. It might be necessary to design additional velocity feedback control loop with a velocity sensor 82 to improve dynamic performance of the closed loop focusing control system. Finally, the auto-focus controller will communicate with the laser cutting system controller using standard hardware and software interfaces.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A distance tracking control system, comprising:
   a non-contact distance sensor for sensing a distance of a movable working member from a surface;

an actuator for making positional adjustments of the working member in response to changes in the distance sensed by the non-contact distance sensor;

a controller connected to the distance sensor and the actuator, the controller receiving data from the non-contact distance sensor and then sending signals to the actuator to make positional adjustments of the working member; and the non-contact distance sensor being one of a single sensor mounted on an arm which sweeps a portion of the surface adjacent to the working member to provide data from which the controller calculates a topographical map, and an array of sensors which blanket a portion of the surface adjacent to the working member to provide data from which the controller calculates a topographical map.

2. A distance tracking control system, comprising:

a non-contact distance sensor for sensing a distance of a movable working member from a surface, the non-contact distance sensor being a single sensor mounted on a rotating arm that orbits the working member;

an actuator for making positional adjustments of the working member in response to changes in the distance sensed by the non-contact distance sensor; and a controller connected to the distance sensor and the actuator, wherein the controller uses data from the non-contact distance sensor to calculate a topographical map of the surface covered within an axis of rotation of the single sensor mounted on the rotating arm and then sends signals to the actuator to make positional adjustments of the working member.

3. A distance tracking control system, comprising:

a non-contact distance sensor for sensing a distance of a movable working member from a surface, wherein the non-contact distance sensor is a single sensor mounted on a steerable arm that sweeps a portion of the surface adjacent to the working member with the positioning of the arm being adjustable according to the future direction of movement of the working member;

an actuator for making positional adjustments of the working member in response to changes in the distance sensed by the non-contact distance sensor; and a controller connected to the distance sensor and the actuator, the controller steering the arm to modify the position of the single sensor, using data from the non-contact distance sensor to calculate a topographical profile of the surface along a trajectory of the working member and then sending signals to the actuator to make positional adjustments of the working member.

4. A distance tracking control system, comprising:

a non-contact distance sensor for sensing a distance of a movable working member from a surface, the non-contact distance sensor being an array of sensors, the array of sensors being arranged in a linear scanning array to blanket a portion of the surface in advance of the working member;

an actuator for making positional adjustments of the working member in response to changes in the distance sensed by the non-contact distance sensor; and a controller connected to the distance sensor and the actuator, the controller using data from the non-contact distance sensor to calculate a topographical map of the surface covered within the array of sensors, and then sending signals to the actuator to make positional adjustments of the working member.

5. A distance tracking control system, comprising:

a non-contact distance sensor for sensing a distance of a movable working member from a surface, the non-contact distance sensor being an array of sensors, the array of sensors being arranged in a circumferential scanning array to blanket a portion of the surface around the working member;

an actuator for making positional adjustments of the working member in response to changes in the distance sensed by the non-contact distance sensor; and a controller connected to the distance sensor and the actuator, the controller using data from the non-contact distance sensor to calculate a topographical map of the surface covered within the array of sensors, and then sending signals to the actuator to make positional adjustments of the working member.

6. A distance tracking control system, comprising:

at least one transmitting source having a known relationship to a movable working member, the at least one transmitting source emitting an energy beam onto a surface;

at least one non-contact distance sensor for sensing a distance of the working member from the surface, the non-contact distance sensor receiving reflected energy from the energy beam, the at least one non-contact distance sensor being a circumferential sensing array of sensors positioned around the working member;

an actuator for making positional adjustments of the working member in response to changes in the distance sensed by the distance sensor; and a controller connected to the non-contact distance sensor and the actuator, the controller receiving data regarding the reflected energy beam from the at least one receiving source, the controller using the data and the known relationship of the at least one transmitting source to the working member to calculate a topographical map of the surface covered within the array of sensors, and then sending signals to the actuator to make positional adjustments of the working member.

7. The distance tracking control system as defined in claim 6, wherein the non-contact distance sensor senses magnetic fields.

8. The distance tracking control system as defined in claim 6, wherein the non-contact distance sensor senses changes in capacitance.

9. The distance tracking control system as defined in claim 6, wherein the non-contact distance sensor senses light.

10. The distance tracking control system as defined in claim 9, wherein the light is emitted from a laser beam.

11. The distance tracking control system as defined in claim 6, wherein the non-contact distance sensor senses sound.

12. The distance tracking control system as defined in claim 11, wherein the sound is ultrasonic.

13. The distance tracking control system as defined in claim 6, wherein the controller adjusts the speed of the working member as it moves along the surface to ensure the movement of the actuator can be made in sufficient time to avoid a collision with obstructions on the surface.

14. The distance tracking control system as defined in claim 6, wherein the energy beam is a light source.

15. The distance tracking control system as defined in claim 14, wherein the light source is a low energy light beam collimated through a first lens focused upon the surface such that a light spot is projected upon the surface.

16. The distance tracking control system as defined in claim 15, wherein the at least one non-contact sensor is a position sensitive light sensor receiving light from a receiving lens focused upon the light spot on the surface, such that a reflected light spot is projected upon the position sensitive light sensor.

17. The distance tracking control system as defined in claim 6, wherein there is an array of transmitting sources.

18. The distance tracking control system as defined in claim 6, wherein the controller performs distance calculations between the working member and the surface based upon an elapsed time from the emitting of the energy beam by the at least one transmitting source to the receiving of reflected energy from the energy beam by the at least one non-contact distance sensor.

19. The distance tracking control system as defined in claim 6, wherein the controller performs distance calculations between the working member and the surface based upon variations in the angle at which reflected energy from the energy beam emitted by the at least one transmitting source strikes the at least one non-contact distance sensor.

20. The distance tracking control system as defined in claim 6, wherein the controller performs distance calculations between the working member and the surface based upon a phase shift between the energy beam emitted by the at least one transmitting source and the reflected energy from the energy beam received by the at least one non-contact distance sensor.

* * * * *